United States Patent [19]

Smith

[11] Patent Number: 5,596,462

[45] Date of Patent: Jan. 21, 1997

[54] DATA STORAGE DISK CLAMP APPARATUS FOR MINIMIZING DISK CLAMPING FORCE AND SURFACE AREA

[75] Inventor: Gordon J. Smith, Rochester, Minn.

[73] Assignee: International Business Machines Corporation, Armonk, N.Y.

[21] Appl. No.: 346,541

[22] Filed: Nov. 29, 1994

[51] Int. Cl.$^6$ ............................................. G11B 17/02
[52] U.S. Cl. ............................. 360/99.12; 360/98.08
[58] Field of Search ........................ 360/99.12, 98.08, 360/99.08, 98.07, 104

[56] References Cited

U.S. PATENT DOCUMENTS

| | | | |
|---|---|---|---|
| 2,146,519 | 2/1939 | Zimmerman | 360/99.12 |
| 4,864,443 | 9/1989 | Peterson | 360/99.12 |
| 5,031,062 | 7/1991 | Wood et al. | 360/98.08 |
| 5,119,258 | 6/1992 | Tsai et al. | 360/135 |
| 5,267,106 | 11/1993 | Brue et al. | 360/98.08 |
| 5,274,517 | 12/1993 | Chen | 360/98.08 |
| 5,389,398 | 2/1995 | Suzuki et al. | 427/130 |
| 5,428,490 | 6/1995 | Hagen | 360/104 |

FOREIGN PATENT DOCUMENTS

| | | |
|---|---|---|
| 0151666 | 10/1981 | Germany . |
| 61-3322 | 1/1986 | Japan . |
| 63-259863 | 10/1988 | Japan . |
| 3-62379 | 3/1991 | Japan . |
| 3-162785 | 7/1991 | Japan . |
| 4-278252 | 10/1992 | Japan . |
| 2158633 | 11/1985 | United Kingdom . |

OTHER PUBLICATIONS

Herring and Neid—IBM Technical Disclosure Bulletin vol. 17 No. 2, Jul. 1974, pp. 503–504, "Multiple Magnetic Disk Removable Pack".

IBM Technical Disclosure Bulletin, Disk Pack Compliance Clamp, vol. 21, No. 2, Jul. 1978, pp. 802–803.

IBM Technical Disclosure Bulletin, Clamping of Magentic Disk Stack with a Top Ring, vol. 25, No. 3A, Aug. 1982, pp. 1108–1109.

*Primary Examiner*—A. J. Heinz
*Assistant Examiner*—Adriana Giordana
*Attorney, Agent, or Firm*—Merchant, Gould, Smith, Edell, Welter & Schmidt, P.A.

[57] ABSTRACT

A novel disk clamp apparatus to securely mount one or more data storage disks to the hub of a spindle motor using a minimal amount of clamping force and surface area of the data storage disks is disclosed. A plurality of engagement protrusions disposed on the mating surface of the disk clamp preferably penetrate the mating surface of the data storage disk. Corresponding engagement recesses on the mating surface of the data storage disk are formed from penetration of the engagement protrusions or, alternatively, are preformed on the mating surface of the data storage disk. The engagement protrusions may alternatively be disposed on the data storage disk mating surface, while the corresponding engagement recesses are disposed on the clamp mating surface. In another embodiment, interfacial particles are disposed between the mating surfaces of the disk clamp and the data storage disk which penetrate the respective mating surfaces when pressed together. The interfacial particles may be impregnated into a spacer element which is disposed between the disk clamp and data storage disk mating surfaces, and between the mating surfaces of adjacently stacked data storage disks. Upon application of a clamping force, the sharp prominences of the interfacial particles impregnating the spacer penetrate the mating surfaces of the disk clamp and data storage disk.

16 Claims, 6 Drawing Sheets

DATA STORAGE DISK CLAMP APPARATUS FOR MINIMIZING DISK CLAMPING FORCE AND SURFACE AREA

FIELD OF THE INVENTION

The present invention relates generally to data storage systems, and, more particularly, to an apparatus for clamping one or more data storage disks to the hub of a spindle motor using a minimal amount of clamping force and data storage disk surface area.

BACKGROUND OF THE INVENTION

A typical data storage system includes one or more data storage disks coaxially mounted on a hub of a spindle motor. The spindle motor rotates the disks at speeds typically on the order of several thousand revolutions-per-minute (RPM). Digital information, representative of various types of data, is typically written to and read from the data storage disks by one or more transducers, or read/write heads, which are mounted to a rotatably mounted actuator and pass over the surface of the rapidly spinning data storage disks.

The actuator typically includes a plurality of outwardly extending actuator arms, with one or more read/write transducer assemblies being mounted resiliently or rigidly on the extreme end of the actuator arms. The actuator arms are interleaved into and out of the stack of rotating disks, typically by means of a coil assembly mounted to the actuator. The coil assembly generally interacts with a permanent magnet structure, and the application of current to the coil assembly in one polarity causes the actuator arms and transducers to shift in one direction, while current of the opposite polarity causes the actuator arms and transducers to shift in an opposite direction.

In a typical digital data storage system, digital data is stored in the form of magnetic transitions on a series of concentric, closely spaced tracks comprising the surface of the magnetizable rigid data storage disks. The tracks are generally divided into a plurality of sectors, with each sector comprising a number of information fields. One of the information fields is typically designated for storing data, while other fields contain sector identification and synchronization information, for example. Data is transferred to, and retrieved from, specified track and sector locations by the actuator arms and transducers being shifted from track to track, typically under the control of a controller. The transducer assembly typically includes a read element and a write element.

Writing data to a data storage disk generally involves passing a current through the write element of the transducer assembly to produce magnetic lines of flux which magnetize a specific location of the disk surface. Reading data from a specified disk location is typically accomplished by the read element of the transducer assembly sensing the magnetic field or flux lines emanating from the magnetized locations of the disk. As the read element moves over the rotating disk surface, the interaction between the read element and the magnetized locations on the disk surface result in electrical pulses being induced in the read element, thereby indicating transitions in the magnetic field.

It is common practice to employ a clamping apparatus to securely clamp together one or more data storage disks to the hub of a spindle motor. It can be readily appreciated that a data storage disk must be securely mounted to the spindle motor hub to prevent undesirable slippage between the data storage disk and the clamp apparatus which restrains the disk securely around the hub. Even a minimal amount of slippage between the disk contact surface and clamp contact surface can, for example, result in read/write errors, track misregistration errors, and mechanical fatigue of the spindle motor and data storage disk. A typical clamp apparatus, as illustrated in FIG. 3, includes one or more spacers 63 disposed between adjacently stacked data storage disks 24, with the disks 24 and spacers 63 being forced together and secured around the circular hub 27 of the spindle motor 26 by a disk clamp 61. The disks 24 are generally subjected to appreciable levels of axial or radial forces, or a combination of axial and radial forces, resulting from the clamping force produced by the disk clamp 61. Generally, some degree of bowing, rippling, or other detrimental distortion of the disk 24 surface often results from a non-uniform or non-symmetrical distribution of the forces imparted to the disks 24 or from subjecting the disks 24 to excessively high levels of clamping force.

Many disk clamp apparatus have been disclosed, such as those discussed in U.S. Pat. Nos. 5,274,517 and 5,267,106, which purport to provide effective clamping of a plurality of vertically aligned disks 24 to the hub 27 of a spindle motor 26, while minimizing disk distortion or detrimental curvature resulting from axial and radial loading forces imparted on the disks 24 by the disk clamp 61. The disk distortion produced from excessive loading forces exerted on the disks 24 is particularly pronounced near the inner diameter of the disk 24, and gradually reduces in magnitude at outer diameter locations on the disk 24. If the induced disk distortion is sufficiently pronounced, deleterious contact between the transducer 35 and the distorted disk surface can occur, generally causing damage to both the transducer 35 and the affected area of the disk surface. Even in the absence of disk 24 and transducer 35 contact, the disk distortion may introduce read/write errors, track misregistration errors, and other performance errors of varying severity.

Other disclosed prior art disk clamping schemes employ elastomeric material pressed between the disk clamp 61 contact surface 60 and the contact surface 25 of the data storage disk 24. It is purported that utilizing elastomeric material in this configuration distributes more uniformly the loading forces produced by the disk clamp 61 in a direction extending radially outward from the circumference of the central aperture of the disk 24. Although it is believed that the use of elastomeric material in this manner has yet to be incorporated into a data storage system available in the marketplace, use of such elastomeric materials would likely achieve little success, stemming primarily from the mechanical and thermal instability of the relatively low durometer material, and the perceived necessity to routinely replace the material during the service life of the data storage system.

In a conventional disk clamping apparatus, the clamping force is typically increased in an attempt to further reduce the possibility of disk-to-clamp and disk-to-spacer slippage, thereby increasing the axial loading force on the data storage disk stack. As such, traditional clamping approaches generally rely primarily on static friction between the disk and clamp mating surfaces in order to reduce the possibility of disk-to-clamp and disk-to-spacer slippage. Referring to FIG. 4, there is shown an exaggerated illustration of the contact surfaces 60 and 25 of the disk clamp 61 and data storage disk 24, respectively, in accordance with a prior art clamping apparatus. Although macroscopically the contact surfaces 60 and 25 may appear substantially smooth, at a microscopic level, as depicted in FIG. 4, the topographic irregularities of the two contact surfaces 60 and 25 provide for some degree of static friction between the disk clamp 61 and data storage disk 24 contact surfaces. In order to enhance the advantages afforded by static friction between the disk and clamp contact surfaces 25 and 60 respectively, this contact interface generally comprises a significant percentage of disk 24 surface area surrounding the central aperture of the disk 24. Any increase in the size of the contact interface between the disk 24 and disk clamp 61, however, has the adverse effect of reducing the available data storing surface area of the disk 24. This concomitant reduction in the data storage capacity of the disk 24 significantly effects the storage capacity of a data storage system, and, in particular, small and very small form factor data storage systems.

In the data storage system manufacturing community, there exists a need to increase the data storing surface area of a data storage disk, and to reduce the amount of disk surface area allocated for mounting the disk to the hub of the spindle motor. There exists a further need to substantially reduce or eliminate detrimental disk distortion resulting from clamping forces produced by a clamp apparatus when securely mounting the disk to the spindle motor hub. The present invention fulfills these and other needs.

SUMMARY OF THE INVENTION

The present invention is a novel disk clamp apparatus that provides secure mounting of one or more data storage disks to the hub of a spindle motor using a minimal amount of clamping force and surface area of the data storage disks. Engagement protrusions disposed on the mating surface of the disk clamp preferably penetrate the mating surface of the data storage disk to form a conforming coupling interface. Corresponding engagement recesses on the mating surface of the data storage disk are formed from penetration of the engagement protrusions or, alternatively, are pre-formed on the mating surface of the data storage disk and configured to receive corresponding engagement protrusions. The engagement protrusions may alternatively be disposed on the data storage disk mating surface, while corresponding engagement recesses are disposed on the clamp mating surface. In another embodiment, interfacial particles are disposed between the mating surfaces of the disk clamp and the data storage disk which penetrate the respective mating surfaces when pressed together under forces produced by the disk clamp. The interfacial particles may be impregnated into a spacer element which is disposed between the disk clamp and data storage disk mating surfaces, and between the mating surfaces of adjacently stacked data storage disks. Upon application of a clamping force, the sharp prominences of the interfacial particles impregnating the spacer penetrate the mating surfaces of the disk clamp and data storage disk.

DETAILED DESCRIPTION OF THE PREFERRED EMBODIMENTS

Figure 1:
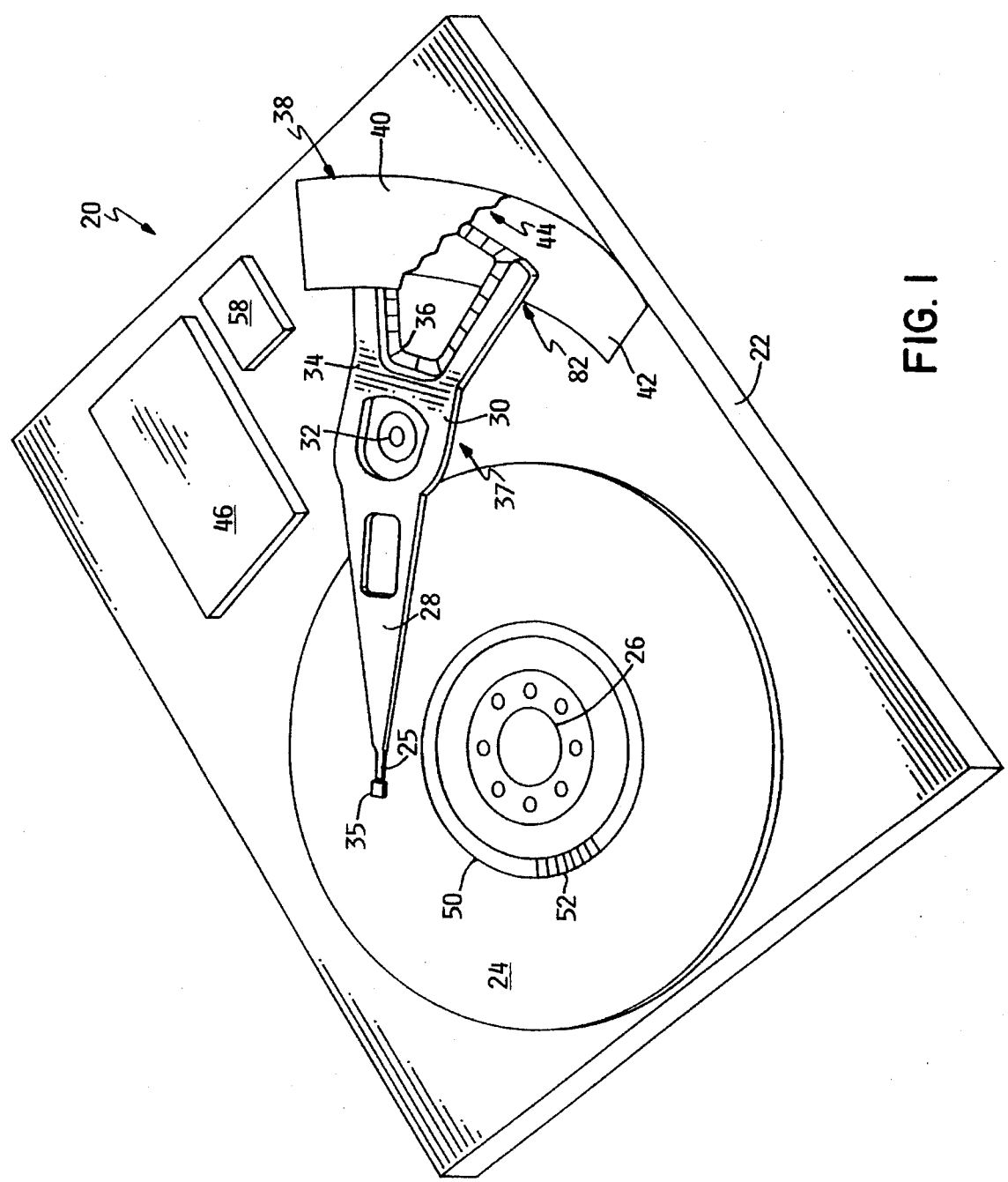
FIG. 1 is a top perspective view of a data storage system with its upper housing cover removed.
Figure 2:
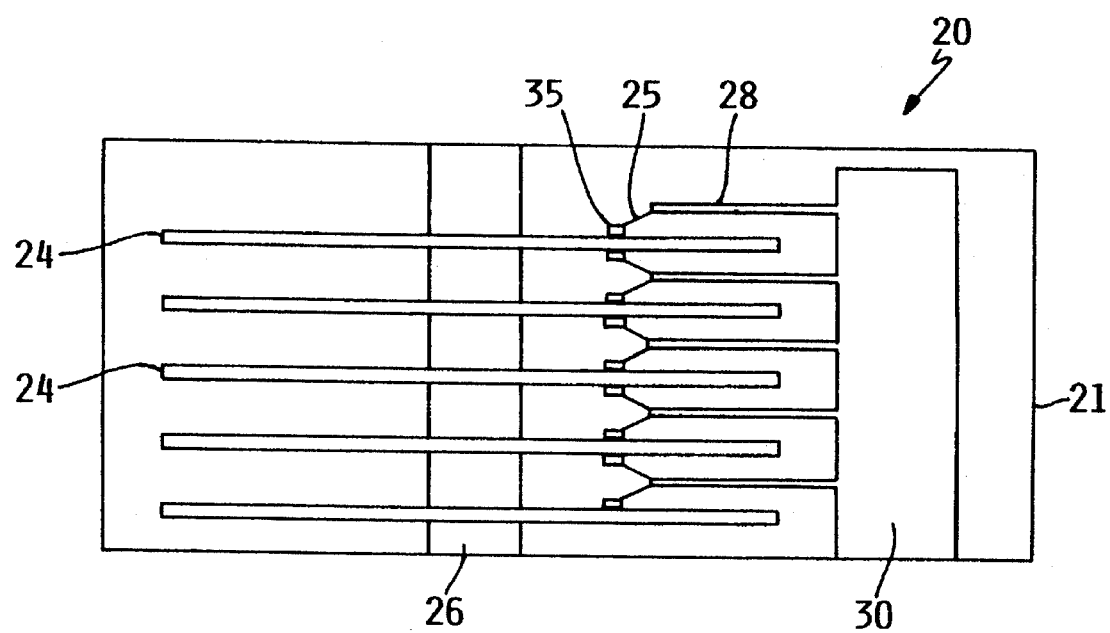
FIG. 2 is a side plan view of a data storage system comprising a plurality of data storage disks.
Figure 3:
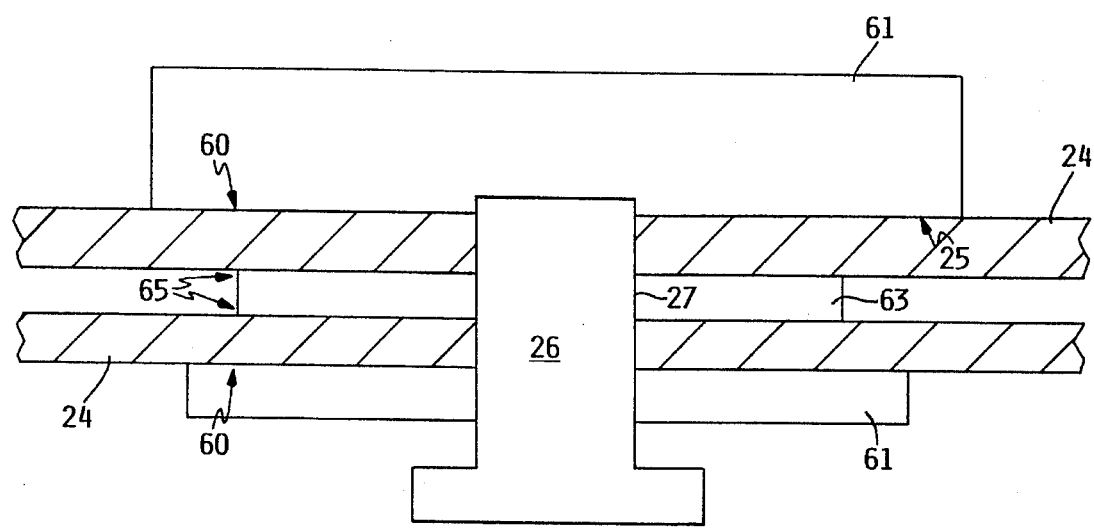
FIG. 3 is a generalized illustration of a data storage disk clamping apparatus adapted for securely mounting one or more data storage disks to the hub of a spindle motor.
Figure 4:
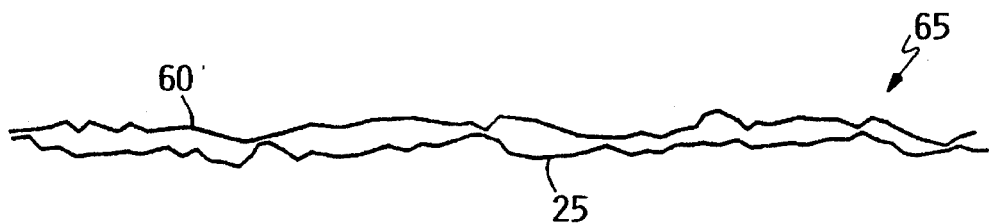
FIG. 4 is a depiction of the disk-to-clamp contact interface or disk-to-spacer contact interface of a prior art data storage disk clamp apparatus.

Referring now to the drawings, and more particularly to FIGS. 1 and 2, there is shown a data storage system 20 having one or more rigid data storage disks 24 stacked coaxially in a tandem spaced relationship which rotate about a common spindle motor 26 at a relatively high rate of rotation. Each disk 24 is typically formatted to include a plurality of spaced concentric tracks 50, with each track being partitioned into a series of sectors 52. The disks 24 may alternatively be formatted to include one or more spiraled tracks.

An actuator 30 typically includes a plurality of interleaved actuator arms 28, with each arm having at least one transducer 35 mounted thereon for reading and writing information onto the data storage disks 24. The actuator 30 is usually mounted to a stationary actuator shaft 32, and rotates thereon to move the actuator arms 28 and transducers 35 into and out of the stack of data storage disks 24. A coil assembly 36, mounted to a coil frame 34 of the actuator 30, generally rotates within a gap 44 defined between the upper and lower magnet assemblies 40 and 42 of a permanent magnet structure 38, causing the actuator arms 28 and transducers 35 to sweep over the surfaces of the data storage disks 24. The spindle motor 26 typically comprises a poly-phase a.c. motor or, alternatively, a d.c. motor energized by a power supply 46 for rotating the data storage disks 24.

The coil assembly 36 and the upper and lower magnet assemblies 40 and 42 of the permanent magnet structure 38 operate in cooperation as an actuator voice coil motor (VCM) 82 responsive to control signals produced by a controller 58. The actuator VCM 82 produces a torquing force on the actuator coil frame 34 when control currents of varying direction and magnitude flow in the coil assembly 36 in the presence of a magnetic field produced by the permanent magnet structure 38. The torquing forces imparted on the actuator coil frame 34, in turn, cause corresponding rotational movement of the actuator arms 28 and transducers 35 in directions dependent on the polarity of the control currents flowing in the coil assembly 36. A controller 58 preferably includes control circuitry that coordinates the transfer of data to and from the data storage disks 24, and cooperates with the actuator VCM 82 to move the actuator arms 28 and transducers 35 to prescribed track 50 and sector 52 locations when reading and writing data to the disks 24.

Figure 5:
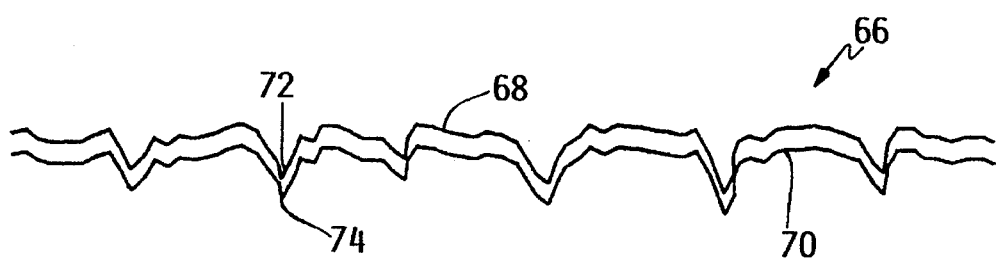
FIG. 5 is an exaggerated depiction of a novel coupling interface for preventing slippage between a data storage disk clamp apparatus and the mating surface of a data storage disk.

Turning now to FIG. 5, there is shown a depiction of the surface topography of a coupling interface 66 illustrating a novel engagement configuration between a data storage disk 24 and a clamp apparatus 61 for securely mounting the data storage disk 24 to a circular hub 27 of a spindle motor 26. In one preferred embodiment, a first mating surface 68 preferably includes a plurality of asperities or engagement protrusions 72 having relatively small radii of curvature. In the embodiment illustrated in FIG. 5, the engagement protrusions 72 penetrate into a second mating surface 70 when the first mating surface 68 and second mating surface 70 are brought into contact under a clamping force produced by the disk clamp apparatus 61. The penetration of the engagement protrusions 72 into the second mating surface 70 results in the production of corresponding engagement recesses 74 on the second mating surface 70. It should be understood that the first mating surface 68 and the second mating surface 70 are respectively representative of the mating surfaces of a disk clamp 61 and a data storage disk 24. Alternatively, the first mating surface 68 is representative of the mating surface of the data storage disk 24, while the second mating surface 70 is representative of the mating surface of the disk clamp 61. Further, the first and second mating surfaces 68 and 70 may instead be respectively representative of the mating surfaces of a spacer element and a data storage disk, with the spacer element being disposed between two adjacently stacked disks 24.

It is well understood that penetration of one material into another material results in a coupling interface that is substantially more resistant to torque loading forces than a contact interface relying merely on the static friction between the two materials to resist such forces. The unique disk-to-clamp coupling interface 66, in contrast to a prior art disk-to-clamp contact interface 65 which relies solely upon frictional resistance between the contact surfaces 62 and 64, restricts or virtually precludes radial movement or other positional shifting between the clamp and disk mating surfaces 68 and 70 during rotation of the data storage disk 24. Penetration of the engagement protrusions 72 into corresponding engagement recesses 74 provides significantly enhanced slip resistance to torque loading forces which must overcome the shear stress of the engagement protrusion 72 material in addition to the static friction associated with the substantially roughened topography of the first and second mating surfaces 68 and 70. The torque loading required to overcome the shear stress of the engagement protrusion 72 material is typically orders of magnitude higher than the torque loading that can be sustained without slippage between the mating surfaces 68 and 70 when relying solely on static friction between the two surfaces 68 and 70.

The second mating surface 70, illustrated in FIG. 5, preferably represents the mating surface of the data storage disk 24 and comprises only a small percentage of the total disk 24 surface area extending radially outward from the central aperture 92 of the disk 24. It is generally recognized that a conventional disk clamping apparatus imparts significant axial and radial forces to the sensitive surface of the data storage disk 24, with maximum stress being localized along the inner diameter of the central disk aperture 92. Varying degrees of undesirable disk 24 surface curvature or distortion, which is particularly pronounced near the inner diameter of the disk 24 proximate the central disk aperture 92, typically results from a nonuniform distribution of axial and radial forces produced by the clamp apparatus 61. The novel coupling interface 66, as illustrated in FIG. 5, provides mating engagement between the mating surfaces 68 and 70 of the disk clamp 61 and data storage disk 24 by the application of clamping forces significantly lower that those that would otherwise be required to maintain secured engagement between the contact surfaces 25 and 60 of a conventional data storage disk 24 and clamp apparatus 61.

More specifically, the penetration of the first mating surface 68 into the second mating surface 70 greatly enhances the slip resistance between the two surfaces 68 and 70 when under the influence of torque loading forces and other forces associated with relatively high rates of spindle motor 26 and data storage disk 24 rotation. When assembling the data storage disk 24 and hub 27/spindle motor 26 structure, the mating surfaces 68 and 70 of the disk clamp 61 and data storage disk 24 are respectively brought into close proximity under the application of an axial force produced by the clamp apparatus 61 sufficient to cause penetration of the engagement protrusions 72 into the relatively softer second mating surface 70, thereby producing corresponding engagement recesses 74. It is noted that the second mating surface 70 of the data storage disk 24 may have hardness characteristics substantially equivalent to those of the first mating surface 68 of the clamp 61. Once penetration has occurred, the axial loading force imparted to the data storage disk 24 by the disk clamp apparatus 61 can typically be reduced.

The reduced level of clamping force required to prevent slippage or shifting respectively between the disk clamp 61 and disk 24 mating surfaces 68 and 70 directly results from the novel coupling interface 66 which exploits the sheer strength of the engagement protrusion 72 material. It has been determined that only a fraction of the total asperities or engagement protrusions 72 disposed on the first mating surface 68 need penetrate the second mating surface 70 to ensure secured coupling between the data storage disk 24 and disk clamp 61. Accordingly, the occurrence and magnitude of undesirable disk 24 curvature typically resulting from appreciable levels of axial and radial loading forces imparted by the clamping apparatus 61 is substantially reduced or eliminated.

Another important advantage of the novel coupling interface between the data storage disk 24 and disk clamp apparatus 61 concerns the minimizing of disk 24 surface area required to securely clamp the disk 24 to the hub 27 of the spindle motor 26. The substantially strengthened contact interface 66 between the mating surfaces 68 and 70 of the disk clamp 61 and data storage disk 24 provides for a substantial reduction in the amount of disk 24 surface area required to contact and engage the disk clamp apparatus 61. The disk 24 contact surface area that would otherwise be designated for use when mounting the disk 24 to the hub 27 can instead be allocated for the storage of data, thereby increasing the storage capacity of the data storage disk 24.

As the demand for high capacity data storage disks increases, minimizing of the disk 24 surface area required for clamping the disk 24 to the motor spindle hub 27 becomes of significant importance. A moderate increase in the disk surface area dedicated for non-data storage uses for disks employed in small and very small form factor data storage systems, for example, can result in a dramatic reduction in the overall data storage capacity of the disk. It is noted that such small form factor data storage disks typically have diameters on the order of 4.6 centimeters. The novel disk-to-clamp coupling scheme illustrated in FIG. 5 minimizes the disk surface area required to effectively mount and secure the data storage disk 24 to the spindle motor hub 27.

Figure 6:
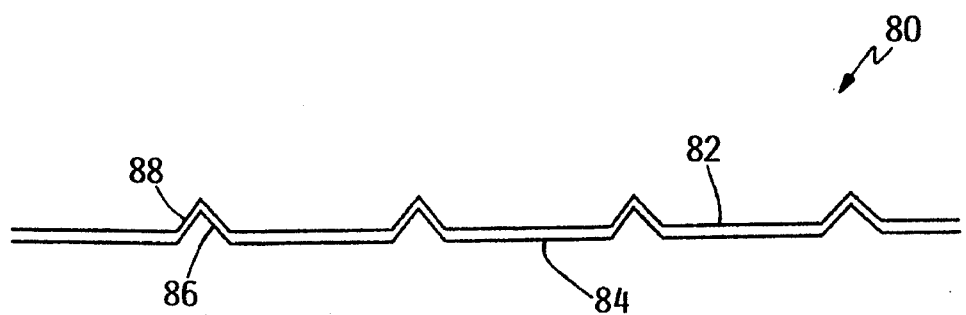
FIG. 6 is an illustration of a novel coupling interface employing a plurality of engagement protrusions and depressions disposed on the mating surfaces of the data storage disk and clamp apparatus.

Referencing now FIG. 6, there is shown an alternative preferred embodiment of the novel disk-to-clamp coupling interface 80. The first and second mating surfaces 82 and 84 of the disk clamp 61 and data storage disk 24, respectively, are shown as having a relatively smooth topography. In the embodiment illustrated in FIG. 6, the second mating surface 84 is preferably representative of the substantially smooth mating surface of a glass or ceramic data storage disk 24, and the first mating surface 82 is preferably representative of the mating surface of the clamp apparatus 61. In one embodiment, the mating surface 82 of the disk clamp 61 is preferably constructed from a material that is softer than the glass or ceramic mating surface 84 of the disk 24, such as aluminum, for example. In another embodiment, the materials forming the mating surfaces of the disk clamp 61 and disk 24 have substantially the same hardness. It is noted that ceramic material suitable for use in the fabrication of a data storage disk 24 typically exhibits a surface hardness of approximately 10 to 100 times that of aluminum.

In one embodiment, the second mating surface 84 of a glass or ceramic data storage disk 24 is preferably etched or otherwise fabricated to include a plurality of engagement protrusions 86 for penetrating into, and engaging with, corresponding engagement depressions 88 provided on the first mating surface 82 of the disk clamp 61. Alternatively, the second mating surface 84 of the data storage disk 24 may be roughened by mechanical or chemical means to provide a high-friction contact surface, with engagement protrusions 86 of varying configuration being received by corresponding engagement depressions 88 disposed on the disk clamp 61 mating surface 82. It is to be understood that the engagement protrusions and depressions 86 and 88 shown as having substantially triangular cross-sectional configurations may instead be fabricated to exhibit substantially rectangular cross sections. Further, other cross-sectional configurations and geometries may be appropriate for data storage disks 24 and disk clamp 61 apparatus having varying configurations and differing construction materials. It is to be further understood that a plurality of engagement protrusions 86 may be disposed on the mating surface of the disk clamp 61 rather than the data storage disk 24 mating surface 84 as illustrated in FIG. 6. A plurality of engagement depressions 88 may, for example, be mechanically or chemically developed on the mating surface 84 of the data storage disk 24.

Figure 7:
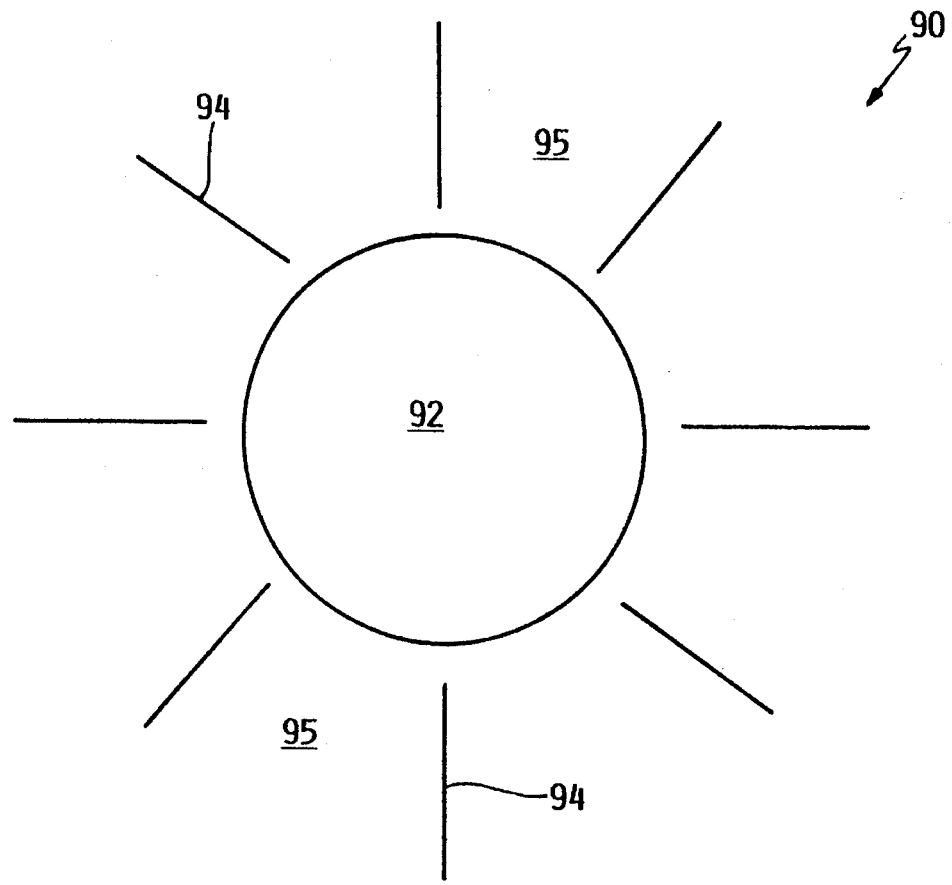
FIG. 7 is an illustration of a novel coupling interface employing a plurality of radial ridges disposed on the surface of a data storage disk for enhancing coupling between the mating surfaces of the data storage disk and clamp apparatus.

One advantage of employing a chemical etching process in the fabrication of the engagement protrusions 86 on the surface of a glass or ceramic data storage disk 24 concerns the ability to optimally design and control the configuration and topography of the mating surface 84 of the disk 24. For example, as illustrated in FIG. 7, a series of radial engagement ridges 94 or spokes may be developed on the mating surface 84 of a glass or ceramic disk 24. The radial engagement ridges 94 preferably engage corresponding radial engagement depressions disposed on the mating surface of the disk clamp 61. The conforming engagement between the engagement ridges 94 of the disk 24 and corresponding engagement depressions disposed on the disk clamp 61 mating surface 82 substantially increases the resistance to radial slippage or other positional shifting that might otherwise occur as the disk 24 and clamp apparatus 61 rotate at relatively high rates of rotation during normal operation of the data storage system 20. A chemical etching process is preferably employed to produce the engagement ridges 94 on the disk 24 mating surface 84, and can be advantageously controlled to maintain coplanarity between the summits of the ridges 94 and the mating surface area 95 of the disk 24 between the engagement ridges 94.

Figure 8:
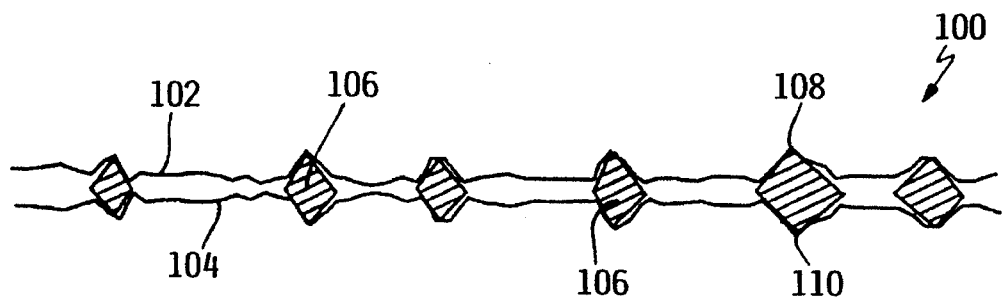
FIG. 8 is an exaggerated illustration of a novel coupling interface employing a plurality of interfacial particles disposed between and penetrating into the mating surfaces of a data storage disk and a clamp apparatus.

Another embodiment of the novel disk-to-clamp coupling interface 100 is illustrated in FIG. 8. In this embodiment, the first and second mating surfaces 102 and 104 are illustrated as having a relatively smooth surface topography, and preferably exhibit substantially similar surface hardness characteristics. It is generally advantageous to employ materials having similar thermal expansion coefficients and characteristics in order to maintain a predictable and stable operating environment which is typically subject to moderate fluctuations in operating temperature. In accordance with this embodiment, a plurality of interfacial particles 106 are disposed between the mating surfaces 102 and 104 of the disk clamp 61 and data storage disk 24, respectively. The interfacial particles 106 are preferably fabricated from material harder than the material of the mating surfaces 102 and 104. The interfacial particles 106 preferably include at least two sharp prominences 108 and 110 having relatively small radii of curvature.

With the interfacial particles distributed approximately uniformly over the mating surface 104 of the data storage disk 24, the disk clamp 61 and disk 24 mating surfaces 102 and 104 are brought into close proximity under the application of a clamping force produced by the disk clamp 61. The applied clamping force causes the sharp prominences 108 and 110 to penetrate respectively into the disk clamp 61 and disk 24 mating surfaces 102 and 104. The shear stress of the interfacial particles 106 in combination with static friction between the disk clamp 61 and disk 24 mating surfaces 102 and 104, respectively, virtually eliminates disk slippage even at relatively low axial loading force levels.

It is generally desirable to maintain the disk clamp 61 and data storage disk 24 mating surfaces 102 and 104 in a substantially parallel relationship. As such, the addition of the interfacial particles 106 interposing the mating surfaces 102 and 104 should be of an appropriate size and shape to prevent disturbance of the coplanarity of the mating surfaces 102 and 104. Ceramic materials, such as silicon dioxide, aluminum oxide, and titanium carbide, are suitable materials for fabricating the interfacial particles 106. These and other similar ceramic materials typically have crystalline structures that promote cleaving along grain boundaries. This results in the production of particles having relatively sharp edges or prominences. The sharp edges permit easy penetration of the interfacial particles 106 into the relatively softer material comprising the disk clamp 61 and data storage disk 24 mating surfaces 102 and 104, respectively.

The relatively inert and stable nature of the ceramic interfacial particles 106 represents another significant advantage of the embodiment illustrated in FIG. 8. The ceramic material from which the interfacial particles 106 are fabricated generally does not react with the chemistry of the disk 24 mating surface 104 or with other materials used in the construction of the data storage system 20. Such ceramic materials, for example, are associated with extremely low levels of undesirable outgassing. Another significant advantage of employing ceramic material concerns the ability to control the size and configuration of the interfacial particles 106. For example, a standard deviation of 0.1 microns for a 2 micron silicon oxide interfacial particle 106 is routinely obtainable by conventional fabrication methods.

Figure 9:
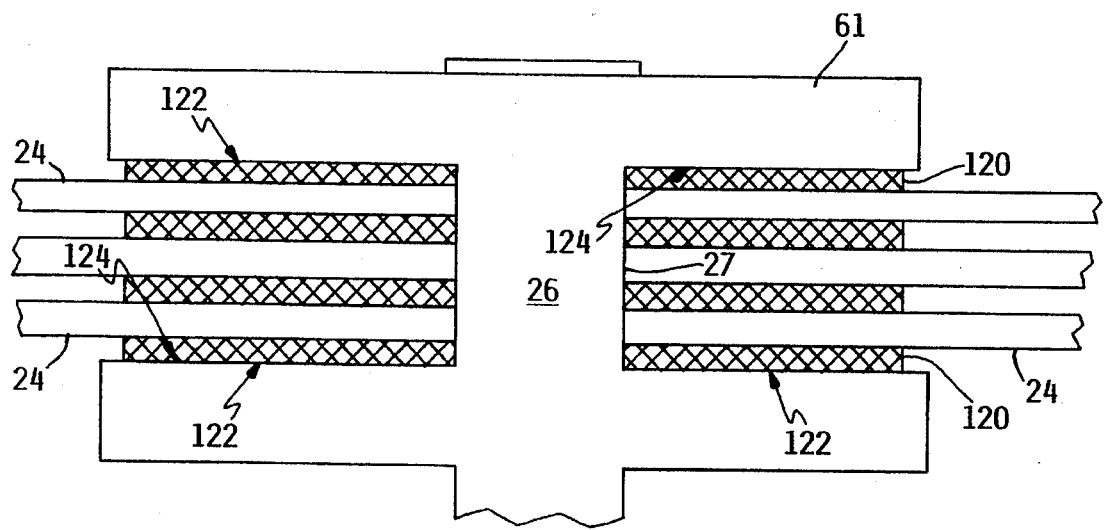
FIG. 9 is an illustration of a novel compliant spacer impregnated with a plurality of interfacial particles and disposed between adjacent disk mating surfaces and the mating surface of a clamp apparatus.
Figure 10:
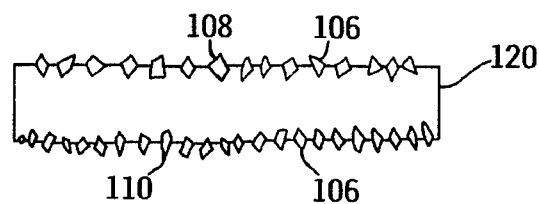
FIG. 10 is an exaggerated side plan view of a novel compliant spacer impregnated with a plurality of interfacial particles.

Turning now to FIGS. 9 and 10, there is shown an alternative embodiment in which a compliant spacer 120, impregnated with a plurality of interfacial particles 106, is disposed respectively between the disk clamp 61 and data storage disk 24 mating surfaces 122 and 124. It may be desirable to contain the interfacial particles 106 between the mating surfaces 122 and 124 of the disk clamp 61 and data storage disk 24 to prevent accidental dislodging of the interfacial particles 106 into the interior of the data storage system housing 21. To preclude any such deleterious escape of the interfacial particles 106 into the relatively contaminant-free environment surrounding the data storage disks 24 and spindle motor assembly 26, a spacer element 120 may be employed as a carrier for the interfacial particle matrix 106.

The spacer 120, for example, may be fabricated in the following manner. The spacer 120 is preferably formed from a polymeric or other compliant material capable of incorporating various fillers to obtain sufficient rigidity. Glass fibers, carbon fillers, and other similar filler material may be introduced into the polymeric matrix to achieve the desired structural rigidity of the spacer 120. The spacer 120 is ground flat so that its contact surfaces are substantially coplanar. The spacer 120, preferably circular in configuration and having an inner aperture adapted for installation around the circular hub 27 of the spindle motor 26, is then placed between two plates that have a hardness substantially equivalent to or harder than the interfacial particles 106. The interfacial particles 106 are then distributed approximately uniformly on the coplanar contact surfaces of the spacer 120, and then pressed into the contact surfaces of the spacer 120 by application of force to the two plates. Following the impregnation of the interfacial particles 106 into the spacer 120, the spacer 120 is then removed and cleaned by a pressurized water rinse or ultrasonic cleaning process. The spacer may then be installed into the data storage system 20.

As shown in FIG. 9, a plurality of data storage disks 24 are preferably mounted in a tandem, spaced relationship around the circular hub 27 of a spindle motor 26. The compliant spacer 120, impregnated with interfacial particles 106, is preferably installed between the mating surfaces 124 of each of the adjacently stacked data storage disks 24. A compliant spacer 120 is also installed between the mating surface 122 of the disk clamp 61 and the mating surface 124 of an adjacent data storage disk 24. In this configuration, the sharp prominences 108 and 110 of the interfacial particles 106 impregnating the compliant space 120 penetrates the adjacent mating surfaces 124 of the data storage disks 24 and the mating surfaces 122 of the disk clamp 61. By virtue of the interfacial particles 106 disposed between adjacent disk 24 and disk clamp 61 mating surfaces, only a minimal amount of axial loading force produced by the disk clamp 61 need be applied to securely clamp one or more data storage disks 24 to the hub 27 of the spindle motor 26. Further, only a minimal amount of disk 24 surface area must be allocated for clamping purposes, thereby maximizing the data storage capacity of the data storage disk.

It will, of course, be understood that various modifications and additions can be made to the embodiments discussed hereinabove without departing from the scope or spirit of the present invention. Accordingly, the scope of the present invention should not be limited by the particular embodiments discussed above, but should be defined only by the claims set forth below and equivalents of the disclosed embodiments.

What is claimed is:

1. A clamp apparatus for clamping a data storage disk around a circular hub, comprising:

a data storage disk disposed on the circular hub and having a substantially rigid mating surface;

a clamp disposed on the circular hub and having a substantially rigid mating surface the data storage disk being disposed between the clamp and the circular hub, and engagement protrusions integrally formed on one of the disk and clamp mating surfaces, the engagement protrusions penetrating the other one of the disk and clamp mating surfaces to form corresponding engagement recesses;

wherein engagement of the engagement protrusions and the corresponding engagement recesses under a clamping force provided by the clamp prevents movement between the clamp and disk mating surfaces during rotation of the data storage disk and circular hub.

2. A clamp apparatus for clamping a data storage disk around a circular hub, comprising:

a data storage disk disposed on the circular hub and having a substantially rigid mating surface;

a clamp disposed on the circular hub and having a substantially rigid mating surface, the data storage disk being disposed between the clamp and the circular hub;

a plurality of engagement protrusions having substantially triangular cross sections and being integrally formed on one of the disk and clamp mating surfaces; and a plurality of engagement depressions having substantially triangular cross sections and being formed on the other one of the disk and clamp mating surfaces and adapted for receiving the engagement protrusions;

wherein engagement of the engagement protrusions and the engagement depressions under a clamping force provided by the clamp prevents movement between the clamp and disk mating surfaces during rotation of the data storage disk and circular hub.

3. A clamp apparatus for clamping a data storage disk around a circular hub, comprising:

a data storage disk disposed on the circular hub and having a substantially rigid mating surface;

a clamp disposed on the circular hub and having a substantially rigid mating surface, the data storage disk being disposed between the clamp and the circular hub and;

a plurality of interfacial particles having sharp prominences integrally formed on one of the disk and clamp mating surfaces and protruding into the other one of the disk and clamp mating surfaces;

wherein protrusion of the plurality of interfacial particles into the other one of the disk and clamp mating surfaces under a clamping force provided by the clamp prevents movement between the clamp and disk mating surfaces during rotation of the data storage disk and circular hub.

4. An apparatus as claimed in claim 3, wherein the interfacial particles comprise ceramic material, and the disk and clamp mating surfaces comprise material softer than the ceramic material of the interfacial particles.

5. A clamp apparatus for clamping a data storage disk around a circular hub, comprising:

a data storage disk disposed on the circular hub and having a substantially rigid mating surface;

a clamp disposed on the circular hub and having a substantially rigid mating surface, the data storage disk being disposed between the clamp and the circular hub and;

a plurality of engagement protrusions integrally formed on one of the disk and clamp mating surfaces and having a hardness greater than a hardness of the other one of the disk and clamp mating surfaces so as to penetrate the other one of the disk and clamp mating surfaces to form a plurality of engagement recesses thereon;

wherein clamped engagement between the engagement protrusions and the engagement recesses restricts movement between the clamp and disk mating surfaces during rotation of the data storage disk and circular hub.

6. A clamp apparatus for clamping a data storage disk around a circular hub, comprising:

a data storage disk disposed on the circular hub and having a substantially rigid mating surface;

a clamp disposed on the circular hub and having a substantially rigid mating surface, the data storage disk being disposed between the clamp and the circular hub;

a plurality of engagement protrusions integrally formed on one of the disk and clamp mating surfaces; and a plurality of engagement recesses formed on the other one of the disk and clamp mating surfaces;

wherein the plurality of engagement protrusions disposed on one of the disk and clamp mating surfaces comprises a sharp prominence that penetrates the other one of the disk and clamp mating surfaces to form at least one of the plurality of engagement recesses, and clamped engagement between the engagement protrusions and engagement recesses restricts movement between the clamp and disk mating surfaces during rotation of the data storage disk and circular hub.

7. A clamp apparatus for clamping a data storage disk around a circular hub, comprising:

a data storage disk disposed on the circular hub and having a substantially rigid mating surface;

a clamp disposed on the circular hub and having a substantially rigid mating surface, the data storage disk being disposed between the clamp and the circular hub;

a plurality of engagement protrusions integrally formed on one of the disk and clamp mating surfaces and having substantially triangular cross sections; and a plurality of engagement recesses formed on the other one of the disk and clamp mating surfaces and having substantially triangular cross sections adapted for receiving corresponding engagement protrusions;

wherein clamped engagement between the engagement protrusions and engagement recesses restricts movement between the clamp and disk mating surfaces during rotation of the data storage disk and circular hub.

8. A clamp apparatus for clamping a data storage disk around a circular hub, comprising:

a data storage disk, comprising ceramic material, disposed on the circular hub and having a substantially rigid mating surface;

a clamp disposed on the circular hub and having a substantially rigid mating surface, the data storage disk being disposed between the clamp and the circular hub;

a plurality of engagement protrusions integrally formed on the mating surface of the disk; and a plurality of engagement recesses formed on the mating surface of the clamp;

wherein clamped engagement between the engagement protrusions on the disk mating surface and corresponding engagement depressions disposed on the clamp mating surface restricts movement between the clamp and disk mating surfaces during rotation of the data storage disk and circular hub.

9. An apparatus as claimed in claim 8, wherein the engagement protrusions comprise a plurality of elongated ridges disposed on the mating surface of the disk extending radially outward from the center of the disk, the elongated ridges on the disk engaging corresponding elongated depressions disposed in the mating surface of the clamp.

10. A clamp apparatus for clamping a data storage disk around a circular hub, comprising:

a data storage disk disposed on the circular hub and having a substantially rigid mating surface;

a clamp disposed on the circular hub and having a substantially rigid mating surface, the data storage disk being disposed between the clamp and the circular hub;

a plurality of engagement protrusions integrally formed on one of the disk and clamp mating surfaces; and a plurality of engagement recesses formed on the other one of the disk and clamp mating surfaces;

wherein a plurality of interfacial particles having sharp prominences is disposed on one of the mating surfaces of the disk and clamp to form the engagement protrusions that penetrate the other one of the disk and clamp mating surfaces to form the engagement recesses, and clamped engagement between the engagement protrusions and engagement recesses restricts movement between the clamp and disk mating surfaces during rotation of the data storage disk and circular hub.

11. A clamp apparatus for clamping a data storage disk around a circular hub, comprising:

a data storage disk disposed on the circular hub and having a substantially rigid mating surface;

a clamp disposed on the circular hub and having a substantially rigid mating surface, the data storage disk being disposed between the clamp and the circular hub;

a plurality of engagement protrusions integrally formed on one of the disk and clamp mating surfaces; and a plurality of engagement recesses formed on the other one of the disk and clamp mating surfaces;

wherein a plurality of interfacial particles are impregnated into compliant material forming a spacer, the spacer being disposed between the disk and clamp mating surfaces and the interfacial particles respectively protruding into the disk and clamp mating surfaces, and clamped engagement between the engagement protrusions and engagement recesses restricts movement between the clamp and disk mating surfaces during rotation of the data storage disk and circular hub.

12. A system for storing data, comprising:

a housing;

a data storage disk having a substantially rigid mating surface;

a spindle motor mounted to the housing and adapted for rotating the data storage disk;

an actuator movably mounted to the housing;

a transducer mounted to the actuator; and a clamp apparatus for clamping a data storage disk around a circular hub, comprising:

a clamp disposed on the circular hub and having a substantially rigid mating surface, the data storage disk being disposed between the clamp and the circular hub;

engagement protrusions integrally formed on one of the disk and clamp mating surfaces and penetrating at a plurality of penetration locations the other one of the disk and clamp mating surfaces to form corresponding engagement recesses;

wherein penetration of the engagement protrusions at the plurality of penetration locations to form the corresponding engagement recesses under a clamping force provided by the clamp prevents movement between the clamp and disk mating surfaces during rotation of the data storage disk and circular hub.

13. A system for storing data, comprising:

a housing;

a data storage disk having a substantially rigid mating surface;

a spindle motor mounted to the housing and adapted for rotating the data storage disk;

an actuator movably mounted to the housing;

a transducer mounted to the actuator; and a clamp apparatus for clamping a data storage disk around a circular hub, comprising:
- a clamp disposed on the circular hub and having a substantially rigid mating surface, the data storage disk being disposed between the clamp and the circular hub;
- a plurality of engagement prominences having substantially triangular cross sections and integrally formed on one of the disk and clamp mating surfaces; and
- a plurality of engagement depressions having substantially triangular cross sections and formed on the other one of the disk and clamp mating surfaces and adapted for receiving corresponding engagement prominences,
- wherein engagement of the engagement depressions and the corresponding engagement prominences under a clamping force provided by the clamp prevents movement between the clamp and disk mating surfaces during rotation of the data storage disk and circular hub.

14. A system for storing data, comprising:

a housing;

a data storage disk having a substantially rigid mating surface;

a spindle motor mounted to the housing and adapted for rotating the data storage disk;

an actuator movably mounted to the housing;

a transducer mounted to the actuator; and a clamp apparatus for clamping a data storage disk around a circular hub, comprising:
- a clamp disposed on the circular hub and having a substantially rigid mating surface, the data storage disk being disposed between the clamp and the circular hub; and
- a plurality of interfacial particles having sharp prominences disposed on one of the disk and clamp mating surfaces and protruding into the other one of the disk and clamp mating surfaces;
- wherein protrusion of the interfacial particles into the other one of the disk and clamp mating surfaces under a clamping force provided by the clamp prevents movement between the clamp and disk mating surfaces during rotation of the data storage disk and circular hub.

15. A system for storing data, comprising:

a housing;

a data storage disk having a substantially rigid mating surface;

a spindle motor mounted to the housing and adapted for rotating the data storage disk;

an actuator movably mounted to the housing;

a transducer mounted to the actuator; and a clamp apparatus for clamping a data storage disk around a circular hub, comprising:
- a clamp disposed on the circular hub and having a substantially rigid mating surface, the data storage disk being disposed between the clamp and the circular hub;
- coupling means, integrally formed on one of the disk and clamp mating surfaces, for penetrating at a plurality of penetration locations the other one of the disk and clamp mating surfaces; and
- a compliant spacer having first and second surfaces respectively impregnated with interfacial particles, the spacer being disposed between the disk and clamp mating surfaces such that the interfacial particles impregnating the first and second spacer surfaces respectively protrude into the disk and clamp mating surfaces;
- wherein the coupling means, under a clamping force provided by the clamp, prevents movement between the clamp and disk mating surfaces during rotation of the data storage disk and circular hub.

16. An apparatus as claimed in claim 15, wherein a plurality of data storage disks is disposed on the circular hub, and a compliant spacer having first and second surfaces respectively impregnated with interfacial particles is disposed between mating surfaces of adjacently mounted disks.

* * * * *